United States Patent
Sorenson et al.

(10) Patent No.: US 12,426,538 B2
(45) Date of Patent: Sep. 30, 2025

(54) SWING-OUT SPREADER FOR AGRICULTURAL COMBINES

(71) Applicant: CNH Industrial America LLC, New Holland, PA (US)

(72) Inventors: William Sorenson, Bettendorf, IA (US); Travis Ohms, Blue Grass, IA (US); Craig E. Murray, Davenport, IA (US); James Seedorf, Bettendorf, IA (US); Kevin Hammer, Benson, MN (US)

(73) Assignee: CNH Industrial America LLC, New Holland, PA (US)

( * ) Notice: Subject to any disclaimer, the term of this patent is extended or adjusted under 35 U.S.C. 154(b) by 726 days.

(21) Appl. No.: 17/686,861

(22) Filed: Mar. 4, 2022

(65) Prior Publication Data

US 2022/0279717 A1   Sep. 8, 2022

Related U.S. Application Data

(60) Provisional application No. 63/156,582, filed on Mar. 4, 2021.

(51) Int. Cl.
*A01D 41/12* (2006.01)
*A01D 69/00* (2006.01)
*A01F 12/40* (2006.01)

(52) U.S. Cl.
CPC ......... *A01D 41/1243* (2013.01); *A01D 69/00* (2013.01); *A01F 12/40* (2013.01)

(58) Field of Classification Search
CPC .............. A01D 41/1243; A01D 41/142; A01D 34/30; A01D 69/00; A01F 12/40
See application file for complete search history.

(56) References Cited

U.S. PATENT DOCUMENTS

| 1,569,882 A | 1/1926 | Reschke |
| 1,625,353 A | 4/1927 | Dugan |

(Continued)

FOREIGN PATENT DOCUMENTS

| DE | 102016125000 A1 | 6/2018 |
| EP | 2684440 A1 | 1/2014 |

OTHER PUBLICATIONS

Extended European Search Report for EP Application No. 22159764.4 dated Jul. 18, 2022 (10 pages).

*Primary Examiner* — Christopher J Sebesta
*Assistant Examiner* — Robert E Pezzuto
(74) *Attorney, Agent, or Firm* — Buchanan Ingersoll & Rooney PC

(57) ABSTRACT

An agricultural vehicle spreader system having a fixed frame, a pivot frame, a pivot joint connecting the pivot frame to the fixed frame for movement about a pivot axis between an operation position and a service position, a spreader assembly, and a power transmission. The pivot joint includes a pivot shaft extending along the pivot axis. The pivot shaft has a drive input and a drive output that is spaced along the pivot axis from the drive input. The spreader assembly has one or more spreaders mounted to the pivot frame and configured to rotate about a respective spreader axis that is offset radially from the pivot axis, and a respective spreader drive input drivingly connected to each of the one or more spreaders. The power transmission operatively connects the pivot shaft drive output to each respective spreader drive input.

22 Claims, 4 Drawing Sheets

(56) References Cited

U.S. PATENT DOCUMENTS

| | | | |
|---|---|---|---|
| 1,886,140 | A | 11/1932 | Welty |
| 2,280,677 | A | 4/1942 | Wagner et al. |
| 2,712,944 | A | 7/1955 | Stevens |
| 2,719,556 | A | 10/1955 | Summerville et al. |
| 4,815,265 | A | 3/1989 | Guinn et al. |
| 4,917,652 | A * | 4/1990 | Glaubitz ............ A01D 41/1243 460/111 |
| 9,357,703 | B2 | 6/2016 | Murray et al. |
| 2003/0114207 | A1 | 6/2003 | Wolters et al. |

* cited by examiner

SWING-OUT SPREADER FOR AGRICULTURAL COMBINES

BACKGROUND OF THE INVENTION

Agricultural vehicles that process crop material often include a system for distributing crop remnants that exit the vehicle. For example, agricultural combine harvesters usually have a spreader that distributes crop residue rearward across the vehicle's travel path. Such spreaders are often made to be movable from the operating position to a service position, to allow greater access to the internal components of the crop processing system. An example of a swing-out spreader assembly is shown in U.S. Pat. No. 9,357,703, which is incorporated herein by reference.

A spreader is a powered component, and the power transmission to the spreader must be accounted for when making the spreader movable. For example, in the case of U.S. Pat. No. 9,357,703, the spreader is powered by hydraulic drives that are mounted directly to the spreader, and motion of the spreader relative to the chassis is facilitated by flexible hoses joining the hydraulic drives to the hydraulic supply in the chassis. This system is relatively expensive, and requires maintenance and service of multiple hydraulic drives. This system also adds significant weight to the spreader, which requires greater supporting structure to prevent the spreader from sagging in the service position.

A more conventional swing-out spreader is shown in U.S. Pat. No. 1,625,353. In this case, the spreader is mounted on a swingarm, and is powered by a single belt that wraps around a horizontal-axis drive pulley on the chassis and a vertical-axis driven shaft on the spreader body. The belt transitions between the drive rotation axis to the driven rotation axis by passing over sheaves that are mounted on tilted axes. When the swingarm is moved to the service position, the spacing between the drive pulley and sheaves decreases, which allows the belt to relax, thereby facilitating movement to the service position. This system conveniently powers the spreader by a power source or driven component internal to the vehicle chassis, however, during service, the belt can come free of the pulleys or sheaves, and must be reset after service is complete to ensure proper placement and tension, leading to relatively complex service requirements.

While swing-out spreaders are known in the art, it has been determined that the state of the art of spreader systems can still be improved.

This description of the background is provided to assist with an understanding of the following explanations of exemplary embodiments, and is not an admission that any or all of this background information is necessarily prior art.

SUMMARY OF THE INVENTION

In a first exemplary aspect, there is provided a spreader system for an agricultural vehicle, the spreader system comprising: a fixed frame; a pivot frame; a pivot joint connecting the pivot frame to the fixed frame for pivotal movement relative to the fixed frame about a pivot axis between an operation position and a service position, the pivot joint including a pivot shaft extending along and configured to rotate about the pivot axis, the pivot shaft having a pivot shaft drive input and a pivot shaft drive output, the pivot shaft drive output being spaced along the pivot axis from the pivot shaft drive input; a spreader assembly comprising: one or more spreaders mounted to the pivot frame and configured to rotate about a respective spreader axis that is offset radially from the pivot axis, and a respective spreader drive input drivingly connected to each of the one or more spreaders; and a power transmission operatively connecting the pivot shaft drive output to each respective spreader drive input.

In some examples, the pivot joint comprises a double-shear pivot joint.

In some examples, the pivot joint is defined by the pivot shaft being rotatably connected to the fixed frame at at least one first location and to the pivot frame at at least one second location.

In some examples, the pivot shaft is rotatably connected to the fixed frame at at least two first locations, with at least one second location being located between the at least two first locations.

In some examples, the pivot axis is vertical when the spreader system is in an operating configuration.

In some examples, the pivot shaft drive input comprises a pivot shaft input pulley, and the spreader system further comprises a transfer pulley rotatably connected to the fixed frame and configured to rotate about a transfer pulley axis, wherein the transfer pulley axis is angled relative to the pivot axis as viewed along a line extending from the pivot shaft input pulley to the transfer pulley.

In some examples, the transfer pulley axis is perpendicular to the pivot axis as viewed along the line extending from the pivot shaft input pulley to the transfer pulley.

In some examples, the spreader system has a power supply pulley configured to rotate about a power supply axis that is parallel to and radially offset from the transfer pulley axis.

In some examples, the spreader system has a single belt drivingly connecting the power supply pulley to the pivot shaft input pulley via the transfer pulley.

In some examples, the spreader system has at least one additional pulley or belt tensioner operatively supporting the single belt.

In some examples, a respective spreader axis of at least one of the one or more spreaders is parallel to the pivot axis.

In some examples, at least one of the one or more spreaders comprises a plate and a plurality of paddles extending from the plate.

In some examples, the one or more spreaders comprises a first spreader having a first spreader drive input and a second spreader having a second spreader drive input; and the power transmission comprises a flexible drive operatively connecting the pivot shaft drive output to each of the first spreader drive input and the second spreader drive input.

In some examples, the power transmission further comprises a tensioner pulley configured to generate tension in the flexible drive.

In some examples, the tensioner pulley is connected to the pivot frame by a tensioner arm, with a tensioner pulley rotation axis being radially offset from a tensioner arm pivot connecting the tensioner arm to the pivot frame.

In some examples, the power transmission further comprises a tensioner arm adjuster operatively connected between the pivot frame and the tensioner arm and configured to apply a force to the tensioner arm to generate a torque about the tensioner arm pivot to thereby control a magnitude of the tension in the flexible drive.

In some examples, the tensioner arm adjuster comprises a hydraulic actuator.

In another exemplary aspect, there is provided an agricultural vehicle comprising: a chassis configured for movement along a surface; and a spreader system as described in any of the aspects and examples provided above.

BRIEF DESCRIPTION OF THE DRAWINGS

Embodiments of inventions will now be described, strictly by way of example, with reference to the accompanying drawings, in which.

In the figures, like reference numerals refer to the same or similar elements.

DETAILED DESCRIPTION OF THE DRAWINGS

Figure 1:
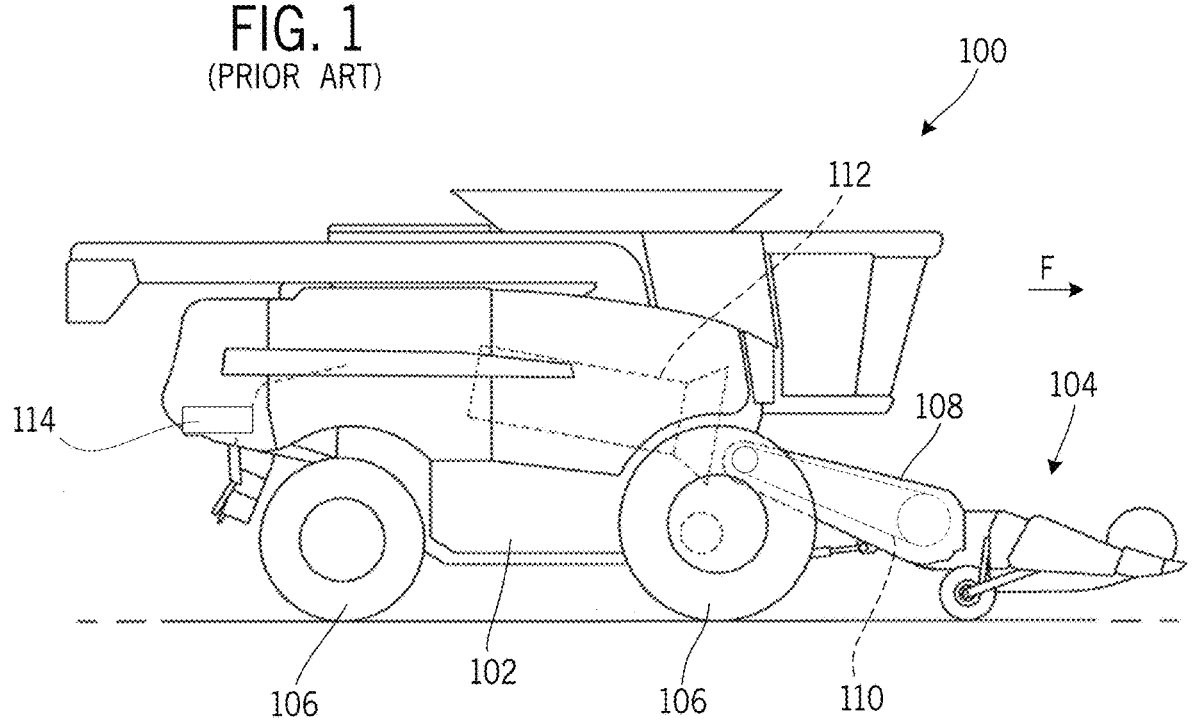
FIG. 1 illustrates a prior art agricultural harvester.

The drawing figures depict one or more implementations in accordance with the present concepts, by way of example only, not by way of limitations. The examples are shown in conjunction with an agricultural combine harvester, but have applicability in any similar agricultural vehicle.

The terms "grain," "straw," and "tailings" are used in this specification principally for convenience, but it is to be understood that these terms are not intended to be limiting. Thus "grain" refers to that part of the crop material which is threshed and separated from the remainder of the crop material and kept for further processing, and the portion of the crop material that is left behind during the harvesting process is referred to as the non-grain crop material, material other than grain ("MOG"), or, simply "straw."

The terms "forward," "rearward," "left," and "right," and the like, when used in connection with movable agricultural equipment such as an agricultural harvester and/or components thereof, are usually determined with reference to the normal direction of forward operative travel of the harvester; but, again, they should not be construed as limiting. The terms "longitudinal" and "transverse" are determined with reference to the fore-and-aft direction of the agricultural harvester and are equally not to be construed as limiting. The term "radially offset" refers to an offset along a direction perpendicular to a rotational axis.

FIG. 1 shows an exemplary embodiment of an agricultural vehicle 100 in the form of a combine harvester. The vehicle 100 generally includes a chassis 102 and a header 104 carried by the chassis 102. The chassis 102 is supported on driving wheels 106 (e.g., tracked wheels or pneumatic tires), as known in the art. The vehicle 100 is configured to move in a forward direction, illustrated as arrow F, during harvesting operations.

The header 104 is connected to the chassis 102 by a feeder assembly 108, which includes a conveyor 110 configured to collect crop material and direct it to a threshing and separating system 112 inside the vehicle 100. The threshing and separating system 112 may include a variety of mechanisms for separating grain from straw, such as threshers, sieves, blowers, and the like. Such devices are known in the art and need not be described in detail herein. As the crop material is processed by the threshing and separating system 112, the grain portion is saved, and the straw portion is moved to the back of the vehicle 100 by augers, conveyors, straw walkers or other known mechanisms. The straw eventually reaches a spreader assembly 114 located at or near the back of the vehicle 100. The spreader assembly 114 spreads the straw behind the vehicle 100, and typically across some or all of the vehicle's travel path.

Figure 2:
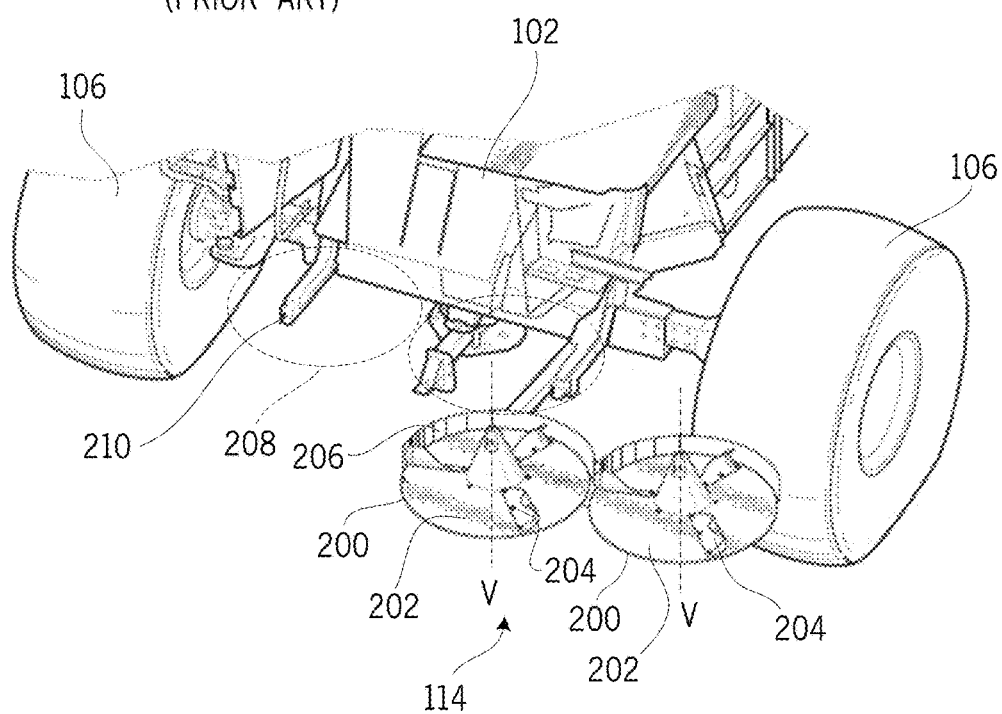
FIG. 2 illustrates a prior art swing-out spreader.

The spreader assembly 114 includes any mechanism(s) suitable for distributing the straw in the desired pattern. For example, as shown in FIG. 2, the spreader assembly 114 may have two spreaders 200, each of which comprises a plate 202 onto which the straw is dropped, and paddles 204 that extend from the plate 202. In use, the plate 202 and the attached paddles 204 are driven to rotate about respective vertical axes V, thereby dispersing the straw in a generally radial direction. Fixed or movable baffles 206 may be provided around the perimeter of the plate 202 to direct the movement of the straw, and thereby control the distribution pattern.

The spreader assembly 114 is movable between an operating position and a service position. FIG. 2 shows the spreader assembly 114 in the service position, in which it is pivoted away from the chassis 102 to allow access to the spreader assembly 114 and to internal components that are normally blocked by the spreader assembly 114. Broken lines 208 show the locations of the plates 202 when the spreader is in the operating position. In the operating position, the plates 202 are located at the end of a straw ejection path, such that the straw falls onto the rotating spreader plates 202 to be ejected from the vehicle 100. The chassis 102 may include any suitable receiver 210 for holding the free end of the spreader assembly 114 in the operating position and supporting the free end in the vertical direction during use. For example, the receiver 210 may comprise an extension of the chassis 102 that is configured to receive a removable pin (not shown) to hold the free end of the spreader assembly 114 to the chassis 102.

It has been determined that existing spreaders 114 can be improved by providing a drive connection from a powered component within the vehicle chassis 102, while still permitting fast and efficient movement of the spreader assembly 114 to the service position. FIGS. 3-6 illustrate an exemplary embodiment of such a spreader system 300.

The spreader system generally includes a fixed frame 302, a pivot frame 304, a pivot joint 306, and a spreader assembly 114. The fixed frame 302 is joined, either permanently or in a releasable manner, to the vehicle chassis 102. The pivot frame 304 is connected to the fixed frame 302 by the pivot joint 306, which is configured to allow the pivot frame 304 to pivot relative to the fixed frame 302 about a pivot axis $A_P$ between an operation position and a service position.

The fixed frame 302 and pivot frame 304 may be constructed in any suitable manner. In the shown example, the fixed frame 302 and pivot frame 304 are both formed from folded sheet metal, or joined metal plates, to form respective self-supporting structures. Alternatively, one or both may be formed as structural space frames or beams with panels to close portions of the assembly, and so on.

Figure 4:
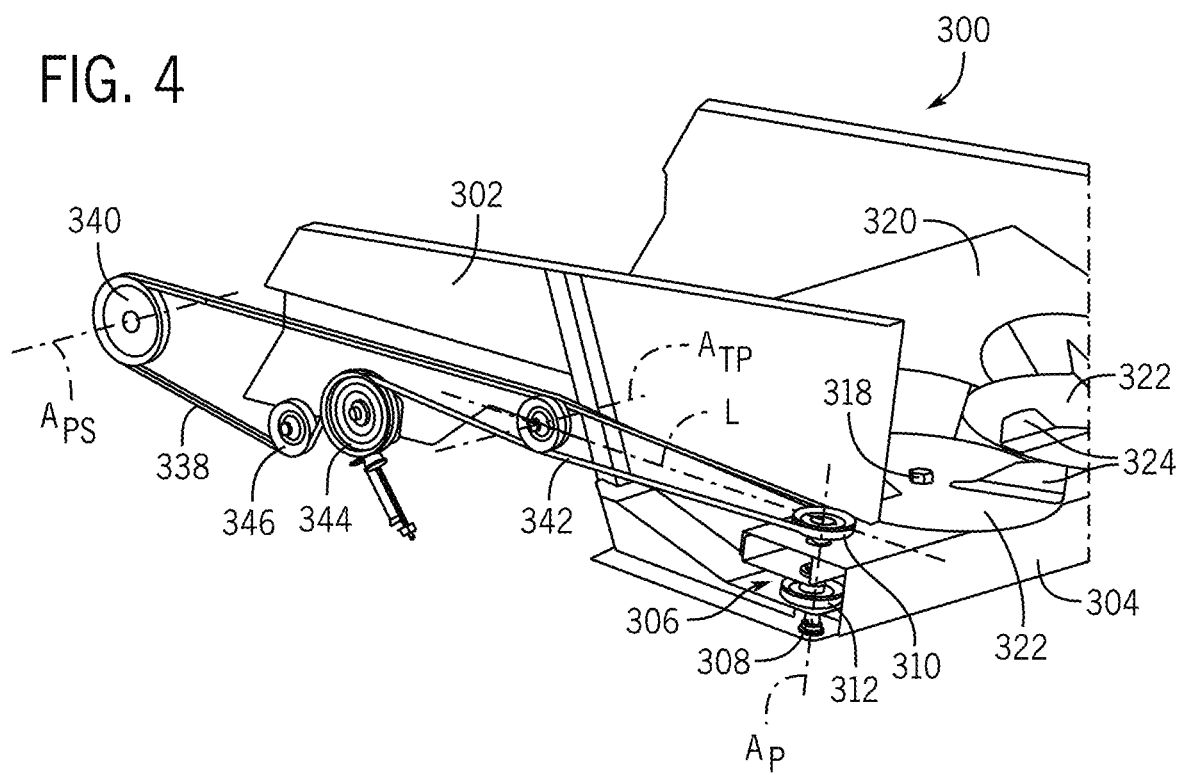
FIG. 4 shows a portion of the spreader system of FIG. 3, with a drive belt cover removed.

The pivot joint 306 includes a pivot shaft 308 that extends along, and is configured to rotate about, the pivot axis $A_P$. The pivot shaft 308 is configured to convey a drive force from a power supply 600 located on the chassis 102 or fixed frame 302 to the spreader assembly 114. To this end, the pivot shaft 308 has a pivot shaft drive input 310 and a pivot shaft drive output 312 that is spaced along the pivot axis $A_P$ from the pivot shaft drive input 310, as best shown in FIG. 4. The pivot shaft drive input 310 and pivot shaft drive output 312 each preferably comprises a pulley, such as the shown V-belt sheaves. In other cases, one or both of the pivot shaft drive input 310 and pivot shaft drive output 312 may comprise a cogged or flat pulley for engagement by a cogged or flat belt, a gear sprocket for engagement with a drive chain, a toothed gear for engagement with a drive gear, and so on. For purposes of this disclosure, the term "pulley" includes any of the foregoing or other rotation drive connections.

Figure 5:
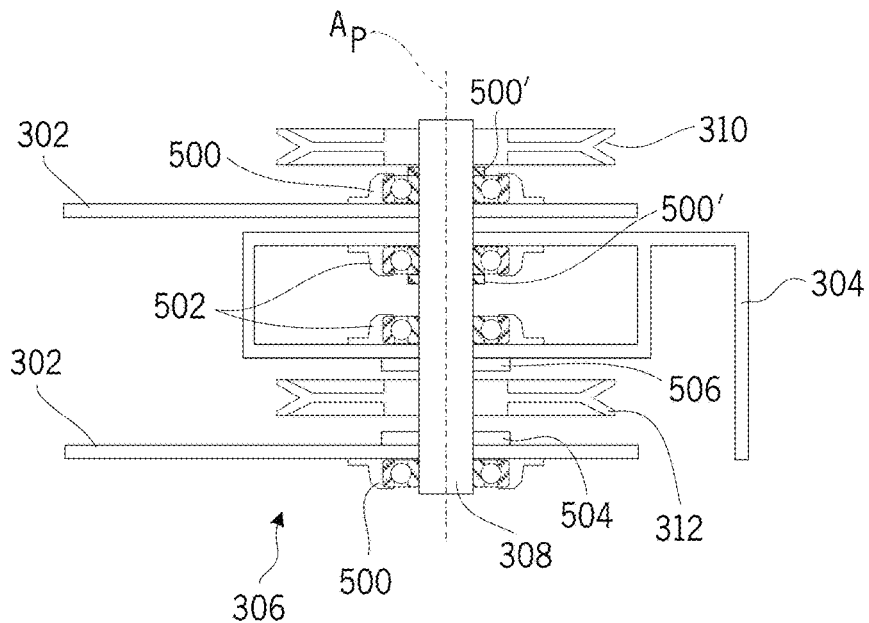
FIG. 5 is a cutaway side view of a pivot joint that may be used with embodiments of spreader systems.

The pivot joint 306 may have any configuration that is suitable for pivotally connecting the pivot frame 304 to the fixed frame 302. FIG. 5 shows an exemplary pivot joint 306 in more detail, in a cross-section view in the transverse direction. In this case, the pivot shaft 308 is rotatably connected to the fixed frame 302 at one or more first locations by one or more respective first bearings 500, and to the pivot frame 304 at one or more second locations by one or more respective second bearings 502. In this example, the pivot shaft 308 is connected to the fixed frame 302 by two first bearings 500, and is connected to the pivot frame 304 by two second bearings 502. The first bearings 500 are mounted at respective first locations on the fixed frame 302, and the second bearings 502 are mounted at respective second locations on the pivot frame 304, such that the second bearings 502 are between the first bearings 500 with respect to the pivot axis $A_P$. This places the pivot shaft 308 in a double-shear connection between the fixed frame 302 and pivot frame 304. This double-shear configuration is preferred to help resist torque loads generated by vertical loading on the pivot frame 306, but is not strictly required.

The pivot joint 306 is configured such that the fixed frame 302 holds the pivot frame 304 in the vertical direction. In the case of FIG. 5, at least some of the bearings 500 include integral locking collars 500' to fix their positions along the pivot axis $A_P$, and thereby fix the pivot frame 304 in the vertical direction relative to the fixed frame 302. Locking collars 500' may be supplemented with and/or replaced by thrust bearings, thrust washers or other support devices. For example, the pivot shaft 308 may have a first thrust washer or thrust bearing 504 located above a portion of the fixed frame 302, and a second thrust washer or thrust bearing 506 located below a portion of the pivot frame 304. Other embodiments may use different configurations of parts to vertically support the pivot frame 304. For example, one or more of the bearings 500, 502 may be selected to support axial loads (e.g., tapered roller bearings) and axially fixed to the pivot shaft 308. Other alternatives and variations will be apparent to persons of ordinary skill in the art in view of the present disclosure.

The pivot shaft drive input 310 and pivot shaft drive output 312 may be provided at any suitable location along the pivot shaft 308. In the example of FIG. 5, the pivot shaft drive input 310 is located above the upper first bearing 500, such that it can be freely accessed for service and more easily connected to and disconnected from a power supply. Also in this example, the pivot shaft drive output 312 is located between the lower first bearing 500 and the lower second bearing 502, where it is partially enclosed between the fixed frame 302 and the pivot frame 304 to protect it from contact with objects over which the vehicle 100 drives. In this example, the pivot shaft drive input 310 and pivot shaft drive output 312 each comprises a respective v-belt sheave, which may be secured to the pivot shaft 308 by any conventional means, such as press fitting, shaft keys, set screws, or the like.

The pivot joint 306 preferably is configured to fully support the weight of the pivot frame 304 and attached parts when the pivot frame 304 is in the service position. This may be accomplished via routine engineering practices to make the pivot joint 306 robust enough to fully support the expected loads. In other cases, however, the pivot joint 306 may not fully support the pivot frame 304 in the service position. For example, in other embodiments, the free end of the pivot frame 304 (i.e., the end opposite the pivot joint 306) may be supported by a retractable guide wheel or skid to help support the weight of the free end when the free end is disconnected from the fixed frame 302 or chassis 102. In either case, when the pivot frame 304 is in the operating position, such as in FIG. 6, the free end of the pivot frame 304 preferably engages a receiver 210 (see FIG. 2) that is formed as part of the fixed frame 302 or chassis 102, to hold the pivot frame 304 in the operating position and support the free end during operation. Such receivers 210 are known in the art, and need not be described herein.

Figure 3:
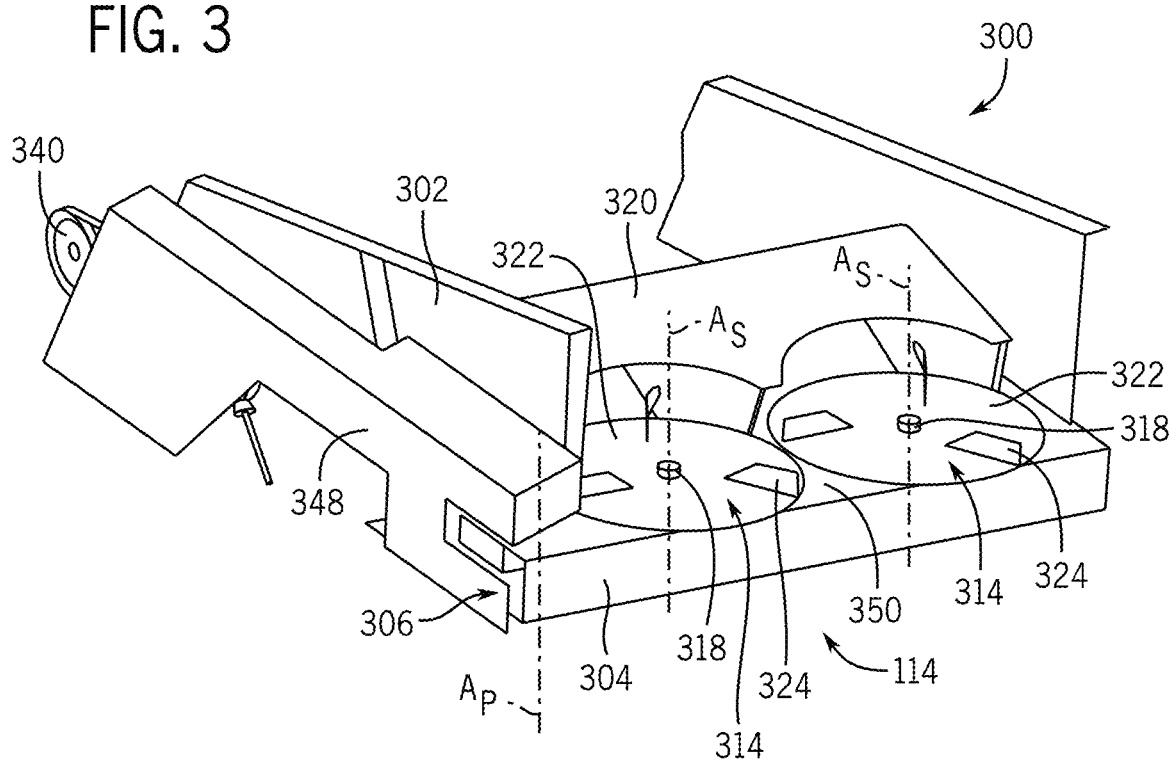
FIG. 3 illustrates an exemplary embodiment of a spreader system, shown in isometric view.
Figure 6:
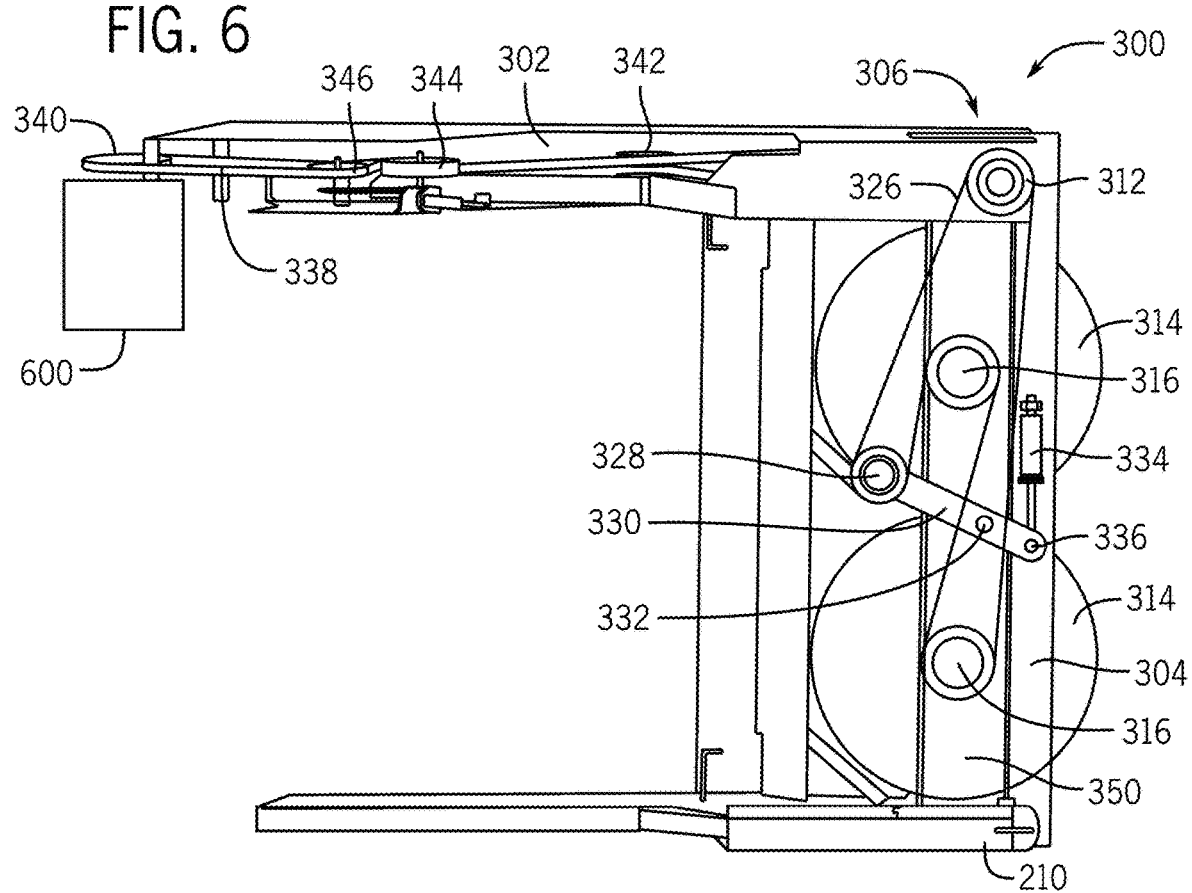
FIG. 6 is a bottom view of the spreader system of FIG. 3.

Referring now to FIGS. 3 and 6, the spreader assembly 114 may comprise any suitable system for spreading straw. In the shown example, the spreader assembly 114 comprises two spreaders 314, but a single spreader 314, or more than two spreaders 314 may be used in other embodiments. Each spreader 314 is mounted to the pivot frame 304 and configured to rotate about a respective spreader axis $A_S$ that is offset radially from the pivot axis $A_P$ (i.e., offset relative to the radial direction of the pivot axis $A_P$). One or both of the spreader axes S preferably is parallel to the pivot axis $A_P$, but this is not strictly required. Each spreader 314 has a respective spreader drive input 316 (FIG. 6) drivingly connected to each of the one or more spreaders 314. In this case, each spreader 314 is rotatably mounted to the pivot frame 304 by a support shaft 318 and one or more bearings (not shown), and each drive input 316 comprises a V-belt sheave that is mounted directly or via a gear train to the respective support shaft 318.

The spreaders 314 may have any suitable configuration for distributing the straw. In this example, the spreaders 314 are located at the end of a straw chute 320, through which straw passes to contact the spreaders 314. The straw chute may be attached to the fixed frame 302 or chassis 102, or it may be attached to the pivot frame 304 such that it is moved out of the way when the pivot frame 304 is in the service position. the straw chute 320 terminates as a panel 350 located between the spreaders 314 and their associated drive inputs 316, to thereby protect the drive components from the straw. Each spreader 314 may comprise a conventional spreader, such as a plate 322 having a plurality of paddles 324 that extend radially from the support shaft 318. Other features, such as baffles to control the range of direction of straw distribution, may also be included.

The spreaders 314 are operatively connected to the pivot shaft drive output 312 by any suitable power transmission. For example, the power transmission may comprises a flexible drive (e.g., a belt or chain) a geared transmission, or the like. In this case, the power transmission is a spreader belt 326 that connects the pivot shaft drive output 312 to each of the spreader drive inputs 316. Conveniently, a single spreader belt 326 may be used to drive two or more spreader drive inputs 316 in the same or opposite directions, depending on the belt path. In this case, the spreader belt 326 drives the two spreaders 314 in opposite directions. Any suitable spreader belt 326 may be used for this purpose, such as a double-sided V-belt or cogged belt. Also, the spreader belt 326 also may be continuous or linked, but a continuous belt may be preferred for additional durability and lower cost.

The exemplary spreader belt 326 extends along a drive path that extends from the pivot shaft drive output 312, to a more distant one of the spreader drive inputs 316, and from there to the more proximal spreader drive input 316. The spreader belt 326 wraps in opposite directions about the two spreader drive inputs 316, to thus drives them in opposite rotational directions. The spreader belt 326 path extends from the more proximal spreader drive input 316 to a tensioner pulley 328, and then back to the pivot shaft drive output 312.

The tensioner pulley 328 is mounted to the pivot frame 304 and configured to generate tension in the spreader belt 326. For example, the tensioner pulley 328 may be connected to the pivot frame 304 by a tensioner arm 330. The tensioner arm 330 is pivotally connected to the pivot frame 304 at a tensioner arm pivot 332, and the tensioner pulley 328 is rotatably connected to the tensioner arm 330 at a tensioner pulley rotation that is radially offset from the tensioner arm pivot 332. The tensioner arm 330 is also connected to the pivot frame 304 by a resilient or adjustable connector to control the amount of tension generated by the tensioner arm 330. For example, the tensioner arm 330 may be connected to the pivot frame 304 by a tensioner arm adjuster 334 that is configured to apply a force to the tensioner arm 330 to generate a torque about the tensioner arm pivot 332. The amount of torque dictates the magnitude of the tension in the spreader belt 326.

In the example of FIG. 6, the tensioner arm adjuster 334 is connected to the tensioner arm 330 at an adjuster pivot 336 that is radially offset from the tensioner arm pivot 332. The tensioner arm adjuster 334 may comprise a rigid link to hold the tensioner arm 330 at a fixed position relative to the pivot frame 304, or it may comprise a resilient link that allows the tensioner arm 330 to move during operation to absorb intermittent high loading on the spreaders 314. In this case, the tensioner arm adjuster 334 comprises a hydraulic actuator that is movable, by operating a suitable hydraulic circuit (not shown), to generate the desired tension in the spreader belt 326. The hydraulic actuator may be connected to an accumulator to allow resilient movement of the tensioner arm 330. In other cases, the tensioner arm adjuster 334 may comprise a spring, or other mechanisms as known in the art. Other alternatives and variations will be apparent to persons of ordinary skill in the art in view of the present disclosure.

Referring now to FIG. 4, the pivot shaft drive input 310 may be operatively connected to any suitable power supply to receive a rotational drive torque to operate the spreader assembly 114. In this case, the pivot shaft drive input 310 comprises a V-belt sheave that receives power from a main drive belt 338, but other flexible drives (e.g., a chain) or a geared transmission may be used. It is also anticipated that the pivot shaft drive input 310 may comprise a direct connection to a drive motor (e.g., the pivot shaft 308 may be an extension of a motor drive shaft).

In this case, the main drive belt 338 is operatively connected to receive drive force from a power supply pulley 340 (e.g., another V-belt sheave). The power supply pulley 340 is rotatably mounted on the fixed frame 302 or the chassis 102, and connected to a power supply 600, such as a hydraulically-operated motor, an electric motor, or a power take-off from a main engine of the vehicle 100. In the shown example, the power supply pulley 340 is configured to rotate about power supply pulley axis $A_{PS}$. In some cases, the power supply pulley axis $A_{PS}$ may be parallel with the pivot axis $A_P$. In such cases, the power supply pulley 340 may be connected to the pivot shaft input pulley 310 by a simple arrangement of flexible drives or gears.

In the shown example, the power supply pulley axis $A_{PS}$ is not parallel with the pivot axis $A_P$. In particular, the power supply pulley axis $A_{PS}$ is orthogonal to a plane in which the pivot axis $A_P$ extends, and therefore the power supply pulley 340 is similarly perpendicular to the pivot shaft drive input 310. In this case, a transfer pulley 342 is provided to rotate the main drive belt 338 between the plane of the power supply pulley 340 and the plane of the pivot shaft drive input 310. The transfer pulley 342 is rotatably fixed to the fixed frame 302 or the chassis 102, and configured to rotate about a transfer pulley axis $A_{TP}$. The transfer pulley axis $A_{TP}$ is angled relative to the pivot axis $A_P$ as viewed along a line L extending from the pivot shaft drive input 310 to the transfer pulley 342, and may be oriented perpendicular to the pivot axis $A_P$ or at any other angle suitable to intermediate movement of the main drive belt 338 between the power supply pulley 340 and the pivot shaft drive input 310. In the shown example, the transfer pulley axis $A_{TP}$ is parallel to and radially offset from the power supply axis $A_{PS}$, but this is not strictly required.

The main drive belt 338 also may be supported by one or more additional pulleys or belt tensioners. For example, the main drive belt 338 may pass over a tensioner pulley 344 that may be adjusted to maintain proper tension on the main drive belt 338, and a fixed reference pulley 346 provided to cooperate with the tensioner pulley 344 to facilitate the provision of suitable tension in the main drive belt 338. The main drive belt 338 and other parts of the drivetrain may be enclosed by a cover 348 (FIG. 3) or the like. Other alternatives and variations will be apparent to persons of ordinary skill in the art in view of the present disclosure.

The foregoing arrangement allows the use of a single main drive belt 338 to provide power from the power supply to the pivot shaft drive input 310, and a single spreader belt 326 to provide power from the pivot shaft drive output 312 to the spreaders 314. This is beneficial to simplify service and reduce replacement costs. However, other embodiments may use multiple belts or chains, or other drive mechanisms in place of the single main drive belt 338 and/or single spreader belt.

The foregoing arrangement also allows the pivot axis $A_P$ to extend vertically when the vehicle 100 is located on a horizontal surface, while being driven via a horizontally-extending power supply. A vertical pivot axis $A_P$ is beneficial because is causes the pivot frame 304 to rotate in a generally horizontal plane, and thus the pivot frame 304 is not affected by gravity pulling the pivot frame 304 into a lower position. Having the power supply pulley axis $A_{PS}$ extend horizontally can be beneficial because, in many cases, the vehicle 100 already includes internal mechanisms that rotate about (or in parallel with) the power supply pulley axis $A_{PS}$. For example the threshing and separating system 112 may include a horizontal tailings drive shaft that operates near the spreader location, which can provide a convenient power supply for the power supply pulley 340.

Embodiments of systems described herein can also provide various other benefits. For example, using the pivot shaft 308 to transfer drive from the power supply pulley 340 to the spreaders 314 allows the pivot frame 304 to move between the operation position and the service position without any effect on the setup of the main drive belt 338 or the spreader belt 326. Thus, the spreader system 300 can be manipulated to allow service behind the pivot frame 304 and spreaders 314 without unnecessary work to disconnect and reconnect and tension the drive belts, and without having to employ complex or expensive mechanisms such as bevel gears to transfer power to the pivot frame 304 or mounting power supplies directly on the pivot frame 304.

The pivot shaft 308 also conveniently acts both as a structural pivot to join the pivot frame 304 to the fixed frame 302, and as a power transmission mechanism. This helps reduce the complexity and number of parts. Furthermore, the pivot frame 304 can be removed from the fixed frame 302 simply by removing the pivot shaft 308. While such benefits can be useful, other embodiments may include a separate means for pivotally mounting the pivot frame 304 to the fixed frame 302. For example, a tubular pivot pin may join the pivot frame 304 to the fixed frame 302, and the pivot shaft 308 may be mounted to rotate within the pivot pin.

While the foregoing example is expected to provide good serviceability and convenience in selecting a power supply, it is not intended to be strictly limiting. Other embodiments may have a different arrangement of parts, such as described above. It is also expected that embodiments may include features that nullify one or more of the possible benefits of the embodiments described herein. For example, in some cases, the pivot axis $A_P$ may be horizontal, such that the pivot frame 304 rotates upwards or downwards to provide access inside the vehicle. Other alternatives and variations will be apparent to persons of ordinary skill in the art in view of the present disclosure.

Figure 7:
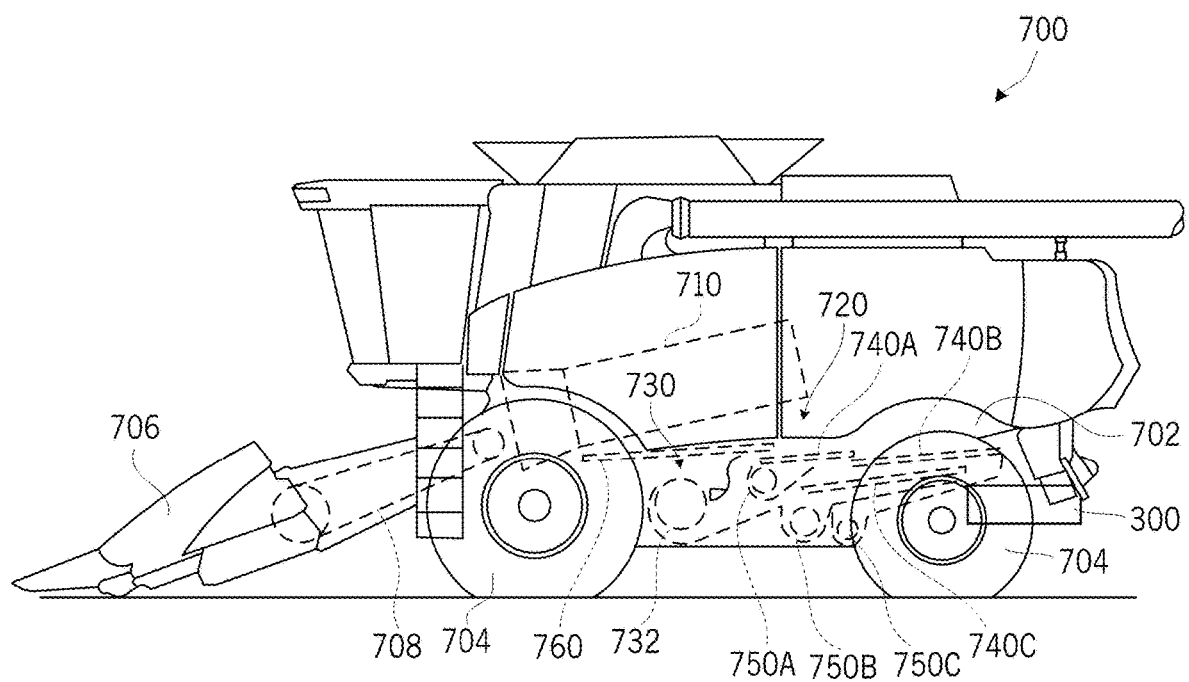
FIG. 7 illustrates a combine harvester incorporating an exemplary spreader system.

FIG. 7 depicts an agricultural vehicle in the form of a combine harvester 700 incorporating a spreader system 300 such as those described herein. Generally, the harvester 700 is a self-propelled vehicle having a chassis 702 that is supported for movement on the ground by a plurality of wheels 704 (e.g., pneumatic tires, tracked wheels, etc.). At a forward end, the harvester 700 has a header 706 operable for severing plants from the ground as the harvester 700 is moved in the forward direction. The header 706 is configured and operable for gathering the cut crops and directing them into a feeder 708. The feeder 708 then conveys the cut crops to a threshing system 710 located generally within the harvester 700.

The harvester 700 also includes a cleaning system 720 for carrying crop material from the threshing system 710, and separating grain from material other than grain ("MOG"). The cleaning system 720 typically includes a cleaning fan system 730, a plurality of sieves 740A, 740B, and 740C, and a plurality of augers 750A, 750B, and 750C. The cleaning fan system 730 comprises a cleaning fan 732 for generating and directing a flow of air upwardly and rearwardly over the sieves 740A, 740B, and 740C (collectively "sieves 740"). The sieves 740 allow grain to fall through, while preventing MOG of various sizes from passing. The augers 750A, 750B, and 750C or other grain conveyors are located below the sieves 740 to collect grain. A grain pan 760 also may be provided to help direct grain from the threshing system 710 to the sieves 750.

The spreader system 300 is positioned downstream of the sieves 740, and in this case at the outlets of the two rearmost sieves 740B, 740C, to receive MOG that has proceeded through the cleaning system 720. The MOG falls onto the spreader system 300, and the spreader system 300 distributes the MOG across the path of the harvester 700.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A spreader system for an agricultural vehicle, the spreader system comprising:
   a fixed frame;
   a pivot frame;
   a pivot joint connecting the pivot frame to the fixed frame for pivotal movement relative to the fixed frame about a pivot axis between an operation position and a service position, the pivot joint including a pivot shaft extending along and configured to rotate about the pivot axis, the pivot shaft having a pivot shaft drive input and a pivot shaft drive output, the pivot shaft drive output being spaced along the pivot axis from the pivot shaft drive input;
   a spreader assembly comprising:
      one or more spreaders mounted to the pivot frame and configured to rotate about a respective spreader axis that is offset radially from the pivot axis, and
      a respective spreader drive input drivingly connected to each of the one or more spreaders; and
   a power transmission operatively connecting the pivot shaft drive output to each respective spreader drive input.

2. The spreader system of claim 1, wherein the pivot joint comprises a double-shear pivot joint.

3. The spreader system of claim 1, wherein the pivot joint is defined by the pivot shaft being rotatably connected to the fixed frame at at least one first location and to the pivot frame at at least one second location.

4. The spreader system of claim 3, wherein the pivot shaft is rotatably connected to the fixed frame at at least two first locations, with at least one second location being located between the at least two first locations.

5. The spreader system of claim 1, wherein the pivot axis is vertical when the spreader system is in an operating configuration.

6. The spreader system of claim 1, wherein the pivot shaft drive input comprises a pivot shaft input pulley, and the spreader system further comprises a transfer pulley rotatably connected to the fixed frame and configured to rotate about a transfer pulley axis, wherein the transfer pulley axis is angled relative to the pivot axis as viewed along a line extending from the pivot shaft input pulley to the transfer pulley.

7. The spreader system of claim 6, wherein the transfer pulley axis is perpendicular to the pivot axis as viewed along the line extending from the pivot shaft input pulley to the transfer pulley.

8. The spreader system of claim 6, further comprising a power supply pulley configured to rotate about a power supply axis that is parallel to and radially offset from the transfer pulley axis.

9. The spreader system of claim 8, further comprising a single belt drivingly connecting the power supply pulley to the pivot shaft input pulley via the transfer pulley.

10. The spreader system of claim 9, further comprising at least one additional pulley or belt tensioner operatively supporting the single belt.

11. The spreader system of claim 1, wherein a respective spreader axis of at least one of the one or more spreaders is parallel to the pivot axis.

12. The spreader system of claim 1, wherein at least one of the one or more spreaders comprises a plate and a plurality of paddles extending from the plate.

13. The spreader system of claim 1, wherein:
the one or more spreaders comprises a first spreader having a first spreader drive input and a second spreader having a second spreader drive input; and
the power transmission comprises a flexible drive operatively connecting the pivot shaft drive output to each of the first spreader drive input and the second spreader drive input.

14. The spreader system of claim 13, wherein the power transmission further comprises a tensioner pulley configured to generate tension in the flexible drive.

15. The spreader system of claim 14, wherein the tensioner pulley is connected to the pivot frame by a tensioner arm, with a tensioner pulley rotation axis being radially offset from a tensioner arm pivot connecting the tensioner arm to the pivot frame.

16. The spreader system of claim 15, wherein the power transmission further comprises a tensioner arm adjuster operatively connected between the pivot frame and the tensioner arm and configured to apply a force to the tensioner arm to generate a torque about the tensioner arm pivot to thereby control a magnitude of the tension in the flexible drive.

17. The spreader system of claim 16, wherein the tensioner arm adjuster comprises a hydraulic actuator.

18. An agricultural vehicle comprising:
a chassis configured for movement along a surface; and
a spreader system for an agricultural vehicle, the spreader system comprising:
a fixed frame;
a pivot frame;
a pivot joint connecting the pivot frame to the fixed frame for pivotal movement relative to the fixed frame about a pivot axis between an operation position and a service position, the pivot joint including a pivot shaft extending along and configured to rotate about the pivot axis, the pivot shaft having a pivot shaft drive input and a pivot shaft drive output, the pivot shaft drive output being spaced along the pivot axis from the pivot shaft drive input;
a spreader assembly comprising:
one or more spreaders mounted to the pivot frame and configured to rotate about a respective spreader axis that is offset radially from the pivot axis, and
a respective spreader drive input drivingly connected to each of the one or more spreaders; and
a power transmission operatively connecting the pivot shaft drive output to each respective spreader drive input.

19. The agricultural vehicle of claim 18, wherein the pivot joint comprises a double-shear pivot joint.

20. The agricultural vehicle of claim 18, wherein the pivot shaft drive input comprises a pivot shaft input pulley, and the spreader system further comprises a transfer pulley rotatably connected to the fixed frame and configured to rotate about a transfer pulley axis, wherein the transfer pulley axis is angled relative to the pivot axis as viewed along a line extending from the pivot shaft input pulley to the transfer pulley.

21. The agricultural vehicle of claim 20, further comprising a power supply pulley configured to rotate about a power supply axis that is parallel to and radially offset from the transfer pulley axis.

22. The agricultural vehicle of claim 18, wherein:
the one or more spreaders comprises a first spreader having a first spreader drive input and a second spreader having a second spreader drive input; and
the power transmission comprises a flexible drive operatively connecting the pivot shaft drive output to each of the first spreader drive input and the second spreader drive input.

* * * * *